(12) United States Patent  (10) Patent No.: US 9,148,224 B2
Diab et al.  (45) Date of Patent: Sep. 29, 2015

(54) ETHERNET PASSIVE OPTICAL NETWORK OVER COAXIAL (EPOC) SYSTEM RATE MECHANISM

(71) Applicant: Broadcom Corporation, Irvine, CA (US)

(72) Inventors: Wael William Diab, San Francisco, CA (US); Edward Boyd, Petaluma, CA (US)

(73) Assignee: BROADCOM CORPORATION, Irvine, CA (US)

( * ) Notice: Subject to any disclaimer, the term of this patent is extended or adjusted under 35 U.S.C. 154(b) by 195 days.

(21) Appl. No.: 13/963,237

(22) Filed: Aug. 9, 2013

(65) Prior Publication Data

US 2014/0341577 A1  Nov. 20, 2014

Related U.S. Application Data

(60) Provisional application No. 61/823,665, filed on May 15, 2013.

(51) Int. Cl.
*H04L 12/24* (2006.01)
*H04B 10/27* (2013.01)

(52) U.S. Cl.
CPC ..................................... *H04B 10/27* (2013.01)

(58) Field of Classification Search
CPC ........................................................ H04B 10/27
See application file for complete search history.

(56) References Cited

U.S. PATENT DOCUMENTS

| 2009/0119524 | A1* | 5/2009 | Hays | 713/322 |
| 2010/0199144 | A1* | 8/2010 | Li et al. | 714/752 |
| 2011/0058813 | A1 | 3/2011 | Boyd et al. | |
| 2011/0142447 | A1 | 6/2011 | Boyd et al. | |

* cited by examiner

*Primary Examiner* — Mohammad Anwar
(74) *Attorney, Agent, or Firm* — Foley & Lardner LLP; Christopher J. McKenna; Daniel E. Rose

(57) ABSTRACT

An Ethernet passive optical network over coaxial (EPOC) system rate mechanism. A network device is provided that includes a physical layer device (PHY) that is configured for coupling to a coaxial cable, a medium independent interface that facilitates data transmission at 10 Gbit/s or greater, and a reconciliation sublayer that is coupled to the PHY via the medium independent interface. The reconciliation sublayer has a codeword detector that is configured to detect a reserved codeword that is received from the PHY over the medium independent interface. The codeword detector can be configured to forward a rate control signal to a media access control (MAC) based on the detection of the reserved codeword.

18 Claims, 4 Drawing Sheets

ETHERNET PASSIVE OPTICAL NETWORK OVER COAXIAL (EPOC) SYSTEM RATE MECHANISM

This application claims priority to provisional application No. 61/823,665, filed May 15, 2013, which is incorporated herein by reference in its entirety.

BACKGROUND

1. Field of the Invention

The present invention relates generally to multipoint control protocols and, more particularly, to an Ethernet passive optical network over coaxial (EPOC) system rate mechanism.

2. Introduction

In a point-to-multipoint system such as an Ethernet passive optical network (EPON), a single optical line terminal (OLT) at a head end can be designed to communicate with a plurality of optical network units (ONUs) at various end nodes. This arrangement leverages a shared fiber optic plant by multiple networking nodes. Typically, the OLT broadcasts its transmissions in the downstream direction to all of the ONUs. Each of the ONUs, on the other hand, transmit in the upstream direction to the OLT in a pre-assigned time slot.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
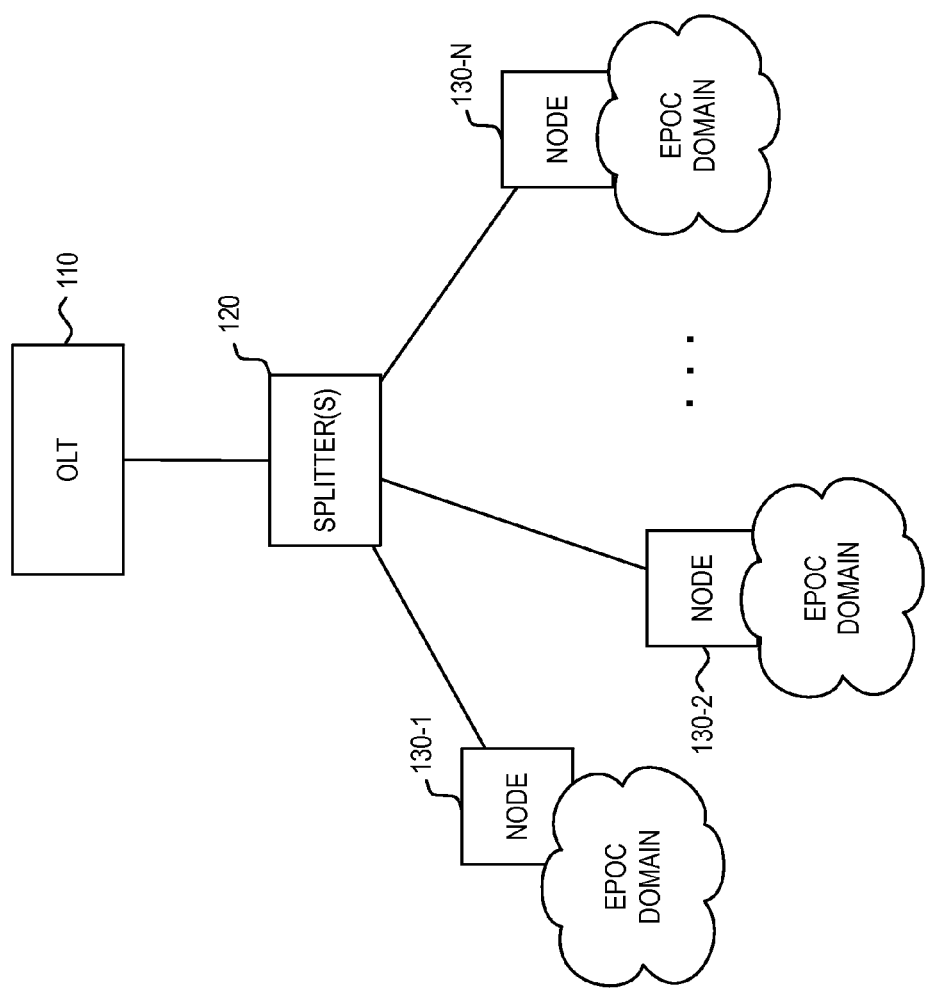
FIG. 1 illustrates an example of a point-to-multipoint communication network that incorporates network devices of the present invention.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In various contexts where the high cost of optical fiber installation may not justify the extension of the optical fiber to the end network unit, mixed media access systems can result. For example, a mixed media access system such as Ethernet PON over coax (EPoC) can be used. In the present invention, it is recognized that there may exist a need to communicate information from a physical layer device (PHY) up to the media access control (MAC) and MAC Client in an EPoC system. For example, in a time division duplexing (TDD) implementation of EPoC, the PHY may have a need to indicate to the MAC that the coaxial medium is not available for transmission.

In accordance with the present invention, a network device is provided that includes a PHY that is configured for coupling to a coaxial cable, a medium independent interface that facilitates data transmission at 10 Gbit/s or greater, and a reconciliation sublayer that is coupled to the PHY via the medium independent interface, the reconciliation sublayer having a codeword detector that is configured to detect a reserved codeword that is received from the PHY over the medium independent interface, the codeword detector being further configured to forward a rate control signal to a MAC device based on the detection of the reserved codeword, the rate control signal being configured to alert the MAC device of an adjustment to a rate of transmission of data from the MAC device to the PHY.

In various embodiments, the network device can be a customer network device, a media converter device, or the like, that can be designed to operate in an EPoC system. In various embodiments, the medium independent interface can be a 10 Gbit/s medium independent interface (XGMII), a 40 Gbit/s medium independent interface (XLGMII), a 100 Gbit/s medium independent interface (CGMII), or the like. In one embodiment, the reserved codeword can be a low power idle (LPI) codeword that is designed for use over the MAC/PHY interface.

Further in accordance with the present invention, a method performed by a network device is provided that includes determining, by a PHY in the network device, that an adjustment to a rate of transmission of data from a MAC device to the PHY is needed, the MAC being coupled to a reconciliation sublayer that communicates with the PHY over a medium independent interface that facilitates data transmission at 10 Gbit/s or greater, the PHY being coupled to a coaxial cable, generating, by the PHY in response to the determination, a reserved codeword for transmission to the reconciliation sublayer over the medium independent interface, detecting, by the reconciliation sublayer, a receipt of the reserved codeword over the medium independent interface, and generating, by the reconciliation sublayer in response to the detecting, a rate control signal for transmission to the MAC device, the rate control signal being configured to alert the MAC device that an adjustment is needed to a rate of transmission of data from the MAC device to the PHY.

To illustrate the various features of the present invention, reference is made first to FIG. 1, which illustrates an example of a point-to-multipoint communication network that incorporates network devices of the present invention. As illustrated, the point-to-multipoint network includes a single OLT 110 that communicates with a plurality of nodes 130-n via a passive optical network (PON). The illustrated PON includes splitter(s) 120, which enable a single optical feeder cable to be split into multiple optical drop cables for the individual nodes 130-n.

Each node 130-n can interface with an EPoC domain that provides further distribution of traffic to a plurality of downstream customer network nodes via coaxial cables. As would be appreciated, an EPoC domain can communicate traffic between one of nodes 130-n and a plurality of downstream customer network nodes using a defined protocol that can be based on time division duplexing (TDD), frequency division duplexing (FDD), or the like.

In one embodiment, nodes 130-n can be configured to serve as a bridge between the PON side and the EPoC side of the access network. Accordingly, a node 130-*n* is coupled from the PON side of the access network to a fiber optic cable, and from the EPoC side of the access network to a coaxial cable. In one embodiment, node 130-*n* includes a coaxial media converter (CMC) 112 that allows PON to EPoC bridging and conversion. In one example, node 130-*n* includes a first PHY for PON encoding and a second PHY for EPoC encoding.

Here, it should be noted that the PON domain can represent an EPON such as that defined by IEEE 802.3, GPON, BPON, xGPON, or NGPON defined by ITU-T, or the like. In general, the advantage of the PON is that it allows sharing of the fiber optic plant by multiple nodes. In the downstream direction, OLT 110 is configured to broadcast frames containing packets to nodes 130-*n* that are responsible for extracting the particular packets that are destined for that particular EPoC domain, while in the upstream direction nodes 130-*n* are designed to transmit traffic from the particular EPoC domain in a way to avoid collisions between the packets using, for example, a time division multiple access (TDMA) communication protocol.

Figure 2:
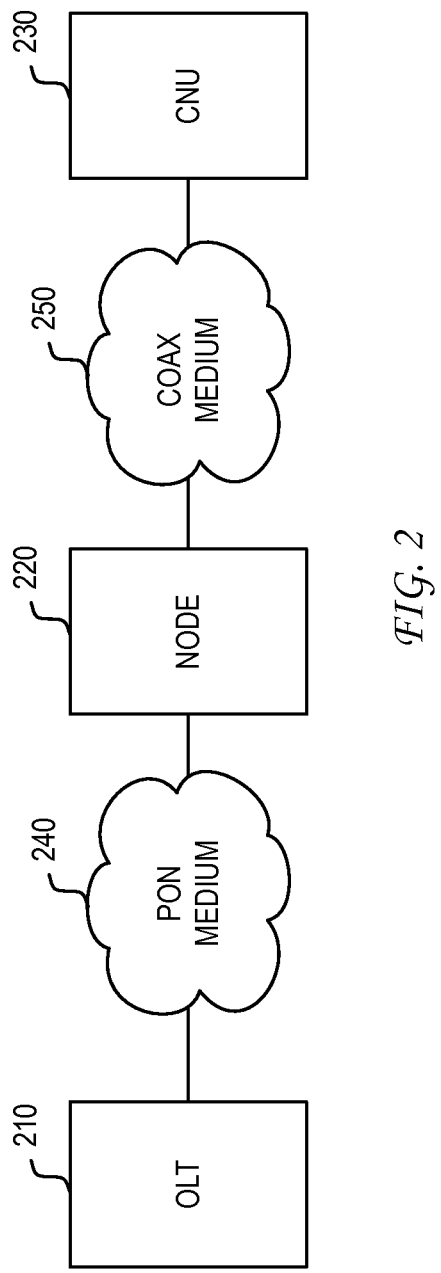
FIG. 2 illustrates an example embodiment of a node according to the present invention that interfaces with a PON domain and an Ethernet passive optical network over coaxial (EPOC) domain.

FIG. 2 illustrates an example of a node according to the present invention that interfaces with a PON domain and an EPoC domain. As illustrated, node 220 of the present invention is configured to communicate with OLT 210 via PON medium 240, and to communicate with customer network node 230 via coaxial medium 250. Both node 220 and customer network unit (CNU) 230, include PHYs that are configured to communicate over a coaxial cabling medium.

As network speeds continue to advance, EPoC systems will be increasingly designed to operate at higher speeds. 10 Gigabit or higher systems represent new standards of performance. In one implementation, an EPoC PHY can be designed to connect to a 10 Gigabit or higher MAC via a medium independent interface. For example, where the EPoC PHY is paired with a 10 Gigabit MAC, the EPoC PHY would communicate with the 10 Gigabit MAC over a 10 Gbit/s medium independent interface (XGMII). Where the EPoC PHY is paired with a 40 Gigabit MAC, the EPoC PHY would communicate with the 40 Gigabit MAC over a 40 Gbit/s medium independent interface (XLGMII). Further, where the EPoC PHY is paired with a 100 Gigabit MAC, the EPoC PHY would communicate with the 100 Gigabit MAC over a 100 Gbit/s medium independent interface (CGMII). As would be appreciated, coupling of the EPoC PHY with even higher rate MACs (e.g., 400 Gigabit, 1000 Gigabit, etc.) would be based on similarly defined medium independent interfaces.

In the present invention, it is recognized that coupling of a lower rate link to a higher rate MAC can lead to rate mismatches at either end of the EPoC domain. For example, coupling of a 2G EPoC link to a 10G MAC would lead to scenarios where the 10G MAC is sending out more traffic than the lower-rate EPoC PHY can handle. In the present invention, it is recognized that implementing a deference mechanism that signals to the 10G MAC that the EPoC PHY cannot handle further traffic is difficult in the 10G or higher MAC environment because legacy deference mechanisms are not supported by XGMII or higher PHY/MAC interfaces.

In the present invention, it is further recognized that modification of the 10G or higher MAC is also not desirable. If the 10G or higher MAC is modified, then a single 10G or higher MAC design cannot be applied to various implementation contexts such as backplane, optical, twisted pair, etc. PHYs. More generally, the retention of the 10G or higher MAC design would lead to minimal changes in the Ethernet switching system, thereby easing the qualification of such network devices.

In many applications of the EPoC domain, the operation of the EPoC PHY both upstream and downstream will be at a substantially lower rate than the rate of the MAC. This can be due in large part to the shared-media nature of the EPoC application. In the downstream direction, the EPoC PHY would be designed to accommodate the traffic for all of the customer network units in that particular EPoC domain. As the connections to each of these customer network units can be independent in nature, the collective traffic for the plurality of connections is unlikely to be at the maximum rated traffic level for other than a very small percentage of time. Similarly, in the upstream direction, a customer network unit can be limited by the transmission scheduling protocol implemented by the EPoC system as well as the service level agreements that govern the individual customer network unit connection. In that regard, two different customer network units in the same EPoC domain can have very different bandwidth requirements as specified by two different service level agreements. More generally, the rate of the EPoC PHYs in a particular EPoC domain can be dependent on a variety of factors, such as a signal-to-noise ratio (SNR), a number of customers in one or more EPoC domains, a number of frequency bands to aggregate, or the like.

In the present invention, it is recognized that an EPoC system can be reliant on EPoC PHYs that exhibit variable-rate characteristics in their implementation within the access network. These variable-rate EPoC PHYs would then be coupled to a fixed-rate MAC that can be configured for significantly higher rates of operation as compared to the actual operating rate of the EPoC PHY. It is therefore a feature of the present invention that an EPoC system rate mechanism is provided. To illustrate these and other features of the present invention, reference is made to FIG. 3.

Figure 3:
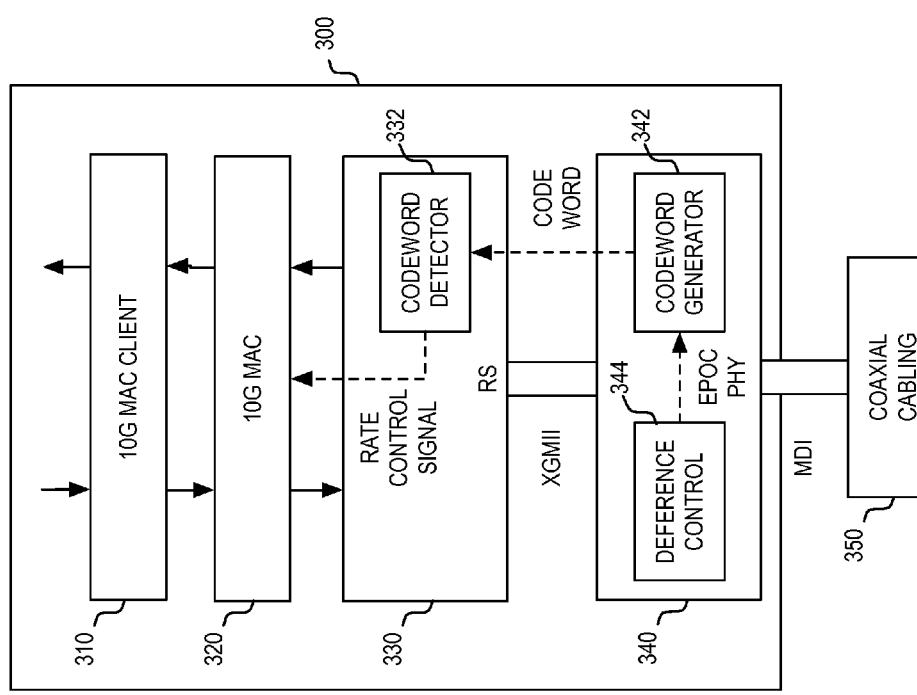
FIG. 3 illustrates an example embodiment of an EPoC system rate mechanism that is illustrated in a context of an Open System Interconnection (OSI) reference model and its mapping to the IEEE 802.3 layering within a network device.

FIG. 3 illustrates an example embodiment of an EPoC system rate mechanism that is illustrated in a context of an Open System Interconnection (OSI) reference model and its mapping to the IEEE 802.3 layering within a network device. As illustrated, network device 300 includes physical layer 340, which can be embodied as an EPoC PHY. The EPoC PHY interfaces with coaxial cabling over a medium dependent interface (MDI).

The EPoC PHY interfaces with MAC layer 320 via reconciliation sublayer (RS) 330, in conjunction with a medium independent interface. Where, as illustrated in FIG. 3, a 10G MAC device is implemented, the medium independent interface can be embodied as an XGMII interface. As noted above, where higher rate MACs are used, the medium independent interface can be embodied as an XLGMII, CGMII, etc.

As noted above, the application of the EPoC PHYs in an EPoC domain can lead to the EPoC PHYs effectively operating at variable rates. This can be problematic where rate mismatches are produced between the MAC and the PHY. In one embodiment, the rate mismatch between the MAC and the PHY is accommodated through an implementation of deference control 344 in an EPoC PHY. In general, the deference control function implemented by deference control 344 within the EPoC PHY is designed to identify those instances where the MAC needs to be held off from further forwarding traffic over the MAC/PHY interface (e.g., XGMII) for transmission by the EPoC PHY over the coaxial cabling.

As would be appreciated, these scenarios can occur where the rate of transmission by the EPoC PHY over the coaxial cabling is lower than the rate of forwarding of traffic to the EPoC PHY by the MAC. If this condition is allowed to persist, then packets can be dropped as buffering available to the EPoC PHY would be exhausted. As such, the deference control function implemented by the EPoC PHY is designed to signal to the MAC that traffic should be buffered at higher layers.

In the illustrated embodiment, deference control 344 is configured to generate a control signal that is provided to codeword generator 342. In response to the receipt of the control signal, codeword generator 342 can be configured to generate a known, reserved codeword that is transmitted over the XGMII interface.

It is a feature of the present invention that the generated codeword can be a reserved codeword that has been previously defined for use over the XGMII interface. For example, the reserved codeword can represent the defined low power idle (LPI) codeword that has been conventionally used to signal an entry of a energy efficient Ethernet (EEE) PHY into a low power state. In the present invention, a known, existing codeword is used to effect a different control mechanism other than the control mechanism for which it was originally designed. In the present invention, it is recognized that the known control mechanism represented by a reserved or otherwise known codeword that can be tunneled through an existing XGMII interface without generating errors, would enable a new EPoC control function to be implemented over the XGMII interface without requiring a modification to the MAC.

In the illustrated embodiment, the codeword generated by codeword generator 342 is transmitted over the XGMII interface and received by codeword detector 332 in RS layer 330. Codeword detector 332 can be configured to detect the receipt of the particular codeword (e.g., LPI codeword) and generate a rate control signal that is sent upward to MAC 320. Here, it is recognized that a conventional receipt of an LPI codeword would be used to trigger actions initiated by an energy efficiency control policy in network device 300. In the present invention, on the other hand, the receipt of an LPI codeword can be redirected in its impact to trigger a rate control action taken by MAC 320. In effect, RS layer 330 reinterprets a previously-defined codeword and maps a new deference function upward to the MAC for rate control purposes.

Figure 4:
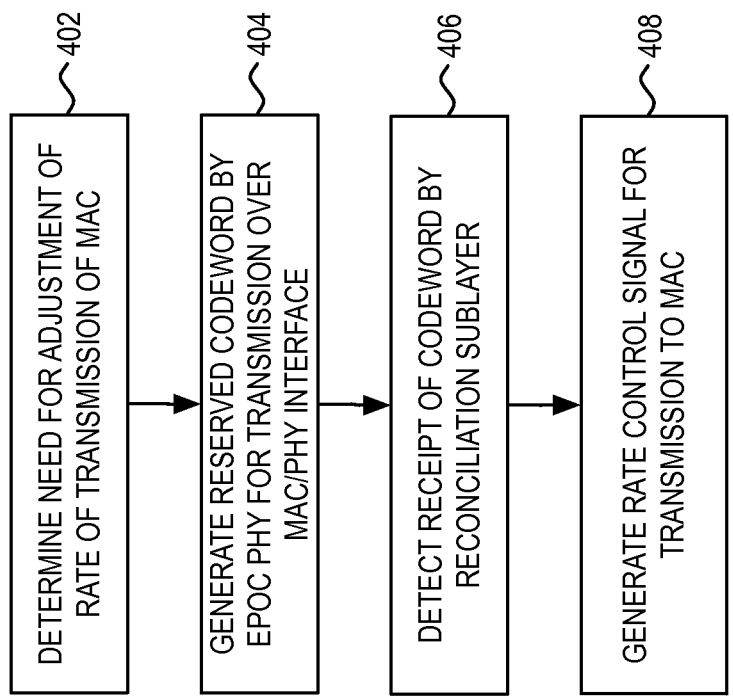
FIG. 4 illustrates a flowchart of an example process of the present invention.

Having described a framework of the present invention, reference is now made to the flowchart of FIG. 4, which illustrates an example process of the present invention. As illustrated, the process begins at step 402 where a deference control mechanism in an EPoC PHY in a network device within an EPoC domain determines that an adjustment to a rate of transmission of data from a 10G or higher MAC device to the EPoC PHY is needed. As would be appreciated, the need for such an adjustment can occur on either end of the EPoC domain and can be in response to current network conditions that produce a scenario where a significant imbalance exists in the transmission rates between the MAC to the EPoC PHY and from the EPoC PHY to the coaxial cabling medium. As would be appreciated, the particular set of conditions that produced the rate mismatch can vary.

When it is determined at step 402 that such a condition exists, the process then continues to step 404 where a codeword generator generates, in response to a control signal by the deference control mechanism, a reserved codeword (e.g., LPI codeword) for transmission to the RS over the medium independent interface. Where the MAC is a 10G MAC, the medium independent interface is an XGMII.

The transmission of the reserved codeword over the medium independent interface is designed to occur without any errors. This is the result of the known nature of the reserved codeword. Next, at step 406, the RS in the network device can then detect the receipt of the reserved codeword over the medium independent interface. Finally, at step 408, the codeword detector in the RS of the network device can generate, in response to the detection at step 406, a rate control signal for transmission to the MAC. This rate control signal can be configured to alert the MAC that an adjustment is needed to a rate of transmission of data from the MAC to the EPoC PHY.

In one embodiment, the rate adjustment produced by the receipt of the rate control signal can be designed to last for a pre-defined amount of time. In another embodiment, the rate adjustment produced by the receipt of the rate control signal can be designed to last for an indefinite period of time until the receipt of a second codeword (e.g., same or different codeword) over the medium independent interface.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A network device, comprising:
a physical layer device, deployed as an intermediary between a first network and second network, configured for coupling to a coaxial cable of the first network;
a medium independent interface that facilitates data transmission at 10 Gbit/s or greater via the second network; and
a reconciliation sublayer, coupled to the physical layer device via the medium independent interface, comprising a codeword detector configured to:
detect a reserved codeword received from the physical layer device over the medium independent interface,
forward a rate control signal to a media access control device based on the detection of the reserved codeword to alert the media access control device of an adjustment to a rate of transmission of data from the media access control device to the physical layer device.

2. The network device of claim 1, wherein the network device is a customer network device.

3. The network device of claim 1, wherein the network device is a media converter device.

4. The network device of claim 1, wherein the network device is a Ethernet passive optical network over coaxial (EPOC) network device.

5. The network device of claim 1, wherein the medium independent interface is a 10 Gbit/s medium independent interface (XGMII).

6. The network device of claim 1, wherein the medium independent interface is a 40 Gbit/s medium independent interface (XLGMII) or 100 Gbit/s medium independent interface (CGMII).

7. The network device of claim 1, wherein the reserved codeword is a low power idle (LPI) codeword.

8. A method performed by a network device, comprising:
determining, by a physical layer device in the network device, that an adjustment to a rate of transmission of data from a media access control device to the physical layer device is needed, the media access control device coupled to a reconciliation sublayer that communicates with the physical layer device over a medium independent interface that facilitates data transmission at 10 Gbit/s or greater, the physical layer device coupled to a coaxial cable;
generating, by the physical layer device in response to the determination, a reserved codeword for transmission to the reconciliation sublayer over the medium independent interface;
detecting, by the reconciliation sublayer, a receipt of the reserved codeword over the medium independent interface; and
generating, by the reconciliation sublayer in response to detecting the receipt of the reserved codeword, a rate control signal for transmission to the media access control device to alert the media access control device that an adjustment is needed to a rate of transmission of data from the media access control device to the physical layer device.

9. The method of claim 8, wherein the network device is a customer network device.

10. The method of claim 8, wherein the network device is a media converter device.

11. The method of claim 8, wherein the Ethernet physical layer device is a Ethernet passive optical network over coaxial (EPOC) network device.

12. The method of claim 8, wherein the medium independent interface is a 10 Gbit/s medium independent interface (XGMII).

13. The method of claim 8, wherein the medium independent interface is a 40 Gbit/s medium independent interface (XLGMII) or 100 Gbit/s medium independent interface (CGMII).

14. The method of claim 8, wherein the reserved codeword is a low power idle (LPI) codeword.

15. A network device, comprising:
a reconciliation sublayer, coupled to a coaxial cable physical layer device via a medium independent interface that facilitates data transmission at 10 Gbit/s or greater, the reconciliation sublayer comprising a codeword detector configured to:
detect a reserved codeword received from the physical layer device over the medium independent interface, and
forward a rate control signal to a media access control device based on the detection of the reserved codeword to alert the media access control device of an adjustment to a rate of transmission of data from the media access control device to the physical layer device.

16. The network device of claim 15, wherein the medium independent interface is a 10 Gbit/s medium independent interface (XGMII).

17. The network device of claim 15, wherein the medium independent interface is a 40 Gbit/s medium independent interface (XLGMII) or 100 Gbit/s medium independent interface (CGMII).

18. The network device of claim 15, wherein the reserved codeword is a low power idle (LPI) codeword.

* * * * *